June 26, 1934.  H. O. BRION  1,964,192
ELECTRIC SWITCH FOR DIRECTION SIGNALS
Filed Sept. 21, 1933  4 Sheets-Sheet 1

Inventor
Harry O. Brion,

Patented June 26, 1934

1,964,192

UNITED STATES PATENT OFFICE 1,964,192

ELECTRIC SWITCH FOR DIRECTION SIGNALS

Harry O. Brion, Rochester, N. Y.

Application September 21, 1933, Serial No. 690,464

17 Claims. (Cl. 200—5)

The invention relates to electric switches for direction signals.

The object of the present invention is to improve the construction of direction signals, more especially that shown and described in Patent No. 1,848,001, granted to me on March 1, 1932, and to simplify the manner of mounting the switch members and the movable elements cooperating therewith and enable such switch elements to be more compactly arranged and to be mounted on two pivot studs instead of three studs, which are necessary with the construction shown and described in the said patent.

A further object of the invention is to enable the switch member which controls the back-up signal to operate the releasing lever and detent and thereby eliminate the separate manually operable plunger provided in the said patent for accomplishing this result.

Another object of this invention is to improve the means for mounting the switch on the steering post of a motor vehicle and also to provide a switch structure adapted to be mounted in the center of the steering wheel and equipped with interiorly arranged means for automatically operating the releasing lever and the detent.

Another object of the invention when the switch mechanism is mounted in the center of the steering wheel, is to equip the switch with a horn button and a switch member for controlling the bright, the dim and the parking lights of a motor vehicle.

A further object of the invention is to provide means for enabling the direction signals of the switch to be set when the steering wheel is in any position.

Furthermore, it is an object of the invention to enable the switch mechanism to be readily assembled in the switch case and the pivotal parts to be easily applied to the pivot studs and securely retained thereon.

With these and other objects in view, the invention consists in the construction and novel combination and arrangement of parts hereinafter fully described, illustrated in the accompanying drawings, and set forth in the claims hereto appended, it being understood that various changes in the form, proportion, and minor details of construction, within the scope of the claims, may be resorted to without departing from the spirit of the invention or sacrificing any of the advantages thereof.

In the drawings:

Fig. 13 is an edge view of the switch base, the finger piece of the two way switch member and the switch member for operating the back-up signal being broken away to illustrate the arrangement of the contacts of the switch members.

Fig. 17 is a detail perspective view of the detent.

Fig. 18 is a detail sectional view on the line

18—18 of Fig. 4, illustrating the manner of mounting the switch members.

Fig. 19 is a similar view on the line 19—19 of Fig. 4, illustrating the manner of mounting the detent, the releasing lever, and other parts on the pivot post.

Figures 1, 3, 4:
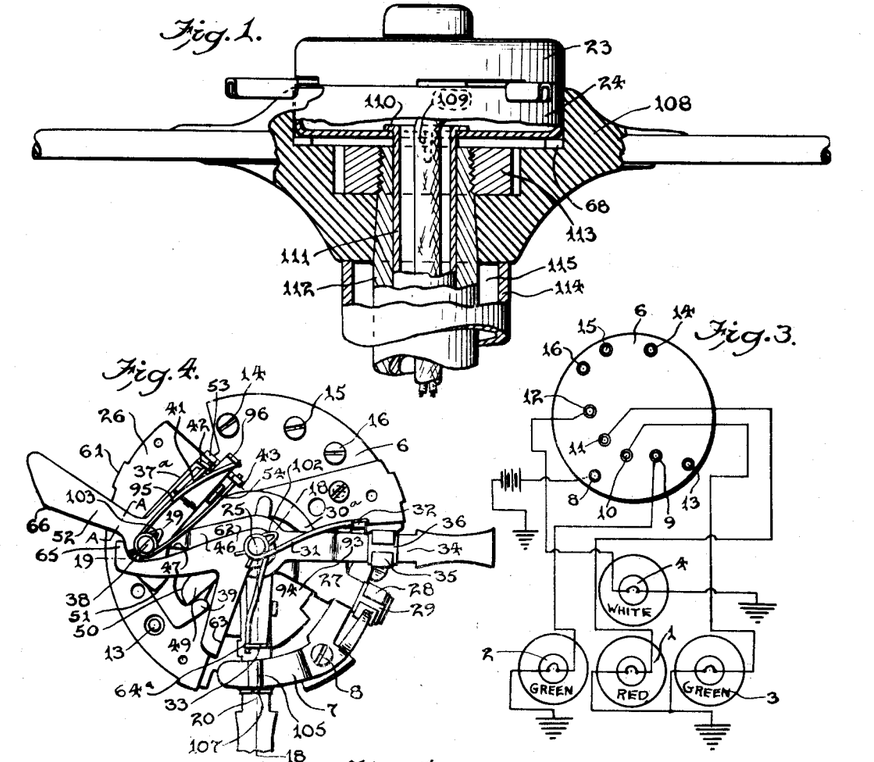
Figure 1 is an elevation of a steering wheel provided with an electric switch mounted in the hub of the steering wheel, parts of the latter being broken away.
Fig. 3 is a diagrammatic view showing the circuits and the signal arrangement.
Fig. 4 is a plan view showing the switch mechanism removed from the case, the parts being in normal position and the releasing lever having its outer arm extended to cooperate with actuating means on the steering wheel.

Referring to Fig. 3, where a diagram of a signalling system is illustrated, 1 designates the usual stop light which is provided with a red lens or other means to give a red light when used on the back of a motor vehicle. When the signal light or lamp 1 is to be used on the front of a vehicle, it is provided with a white lens or other means to give a white light. On opposite sides of this central signal lamp 1 are arranged two lamps 2 and 3, preferably having green lenses or other means to give a green colored light when illuminated. Located above the lamp 1 is a lamp 4 which has a white lens or other means to give a white light when illuminated. When the vehicle is traveling straight ahead and no signal is required, all the said signal lamps are dark. Should, however, a right turn signal be desired, the lamps 1 and 3 are illuminated. The lamps 1 and 2 are illuminated for a left turn and the lamps 1 and 4 are illuminated for a back-up signal.

Figure 10:
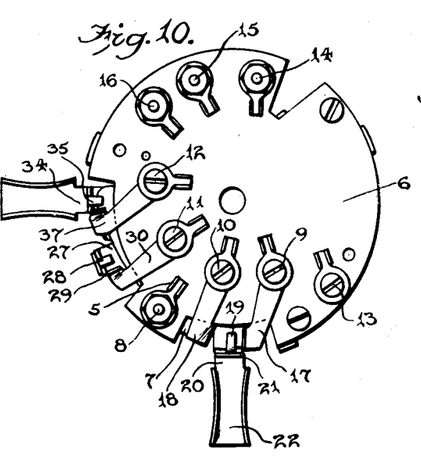
Fig. 10 is a reverse plan view of the switch base showing the contact arrangement.
Figure 11:
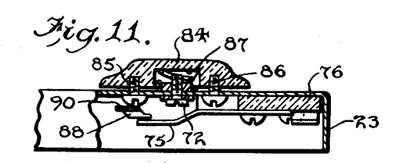
Fig. 11 is a detail sectional view taken substantially on the line 11—11 of Fig. 8 and illustrating the manner of mounting a horn button.

A source of electricity, such as the battery of a motor vehicle, connects with the terminal 5 of a switch base 6 of fiber or any other suitable material. The terminal 5 is connected to a contact 7 by a post 8 which passes through the fiber base 6. This switch base 6 also has contact posts 9 for the left turn light 2, 10 for the right turn light 3, 11 for the stop signal or center light 1, and 12 for the back-up light 4. The base 6 is also provided with contact posts 13 for a horn, 14 for parking lights, 15 for low beam or dim lights, and 16 for high beam or bright lights.

From the posts 9 and 10 project two spring contact fingers 17 and 18, respectively, and, occupying the neutral position normally between these fingers 17 and 18, is a contact 19 secured to a switch member or lever 20 and insulated therefrom by insulation 21. The switch member 20, which has a finger piece 22 projecting beyond case halves or sections 23 and 24, is pivoted at its inner end on a center pivot post or stud 25 fastened to a metal base plate 26 which in turn is mounted on the fiber switch base 6. The switch member 20 may be swung from its neutral or central position in either direction, one to close the circuit between the contact finger 17 and the contact 7, so as to light the lamp 2, and the other to close the circuit between the contact finger 18 and contact 7 so as to light the lamp 3.

With the end in view of closing the circuit to the lamp 1, there is provided a switch member or lever 27 pivoted to the post 25. The switch member 27 has a contact 28 fastened to it and insulated from it by insulation 29. The switch member 27 is so arranged that it will move contact 28 to make contact with a contact finger 30 which is fastened to the contact post 11 thereby closing the circuit to the lamp 1. A spring 31, consisting of a central coil and two sides or arms, is mounted on the center post 25 and is held at one end by a lug 32 on the base plate 26 and at the other end by a lug 33 on the switch member 27. This spring 31 normally tends to hold the contact 28 on the switch member 27 away from the contact finger 30 so that the circuit to the lamp 1 will normally be open.

Figures 2, 6, 7, 8, 9:
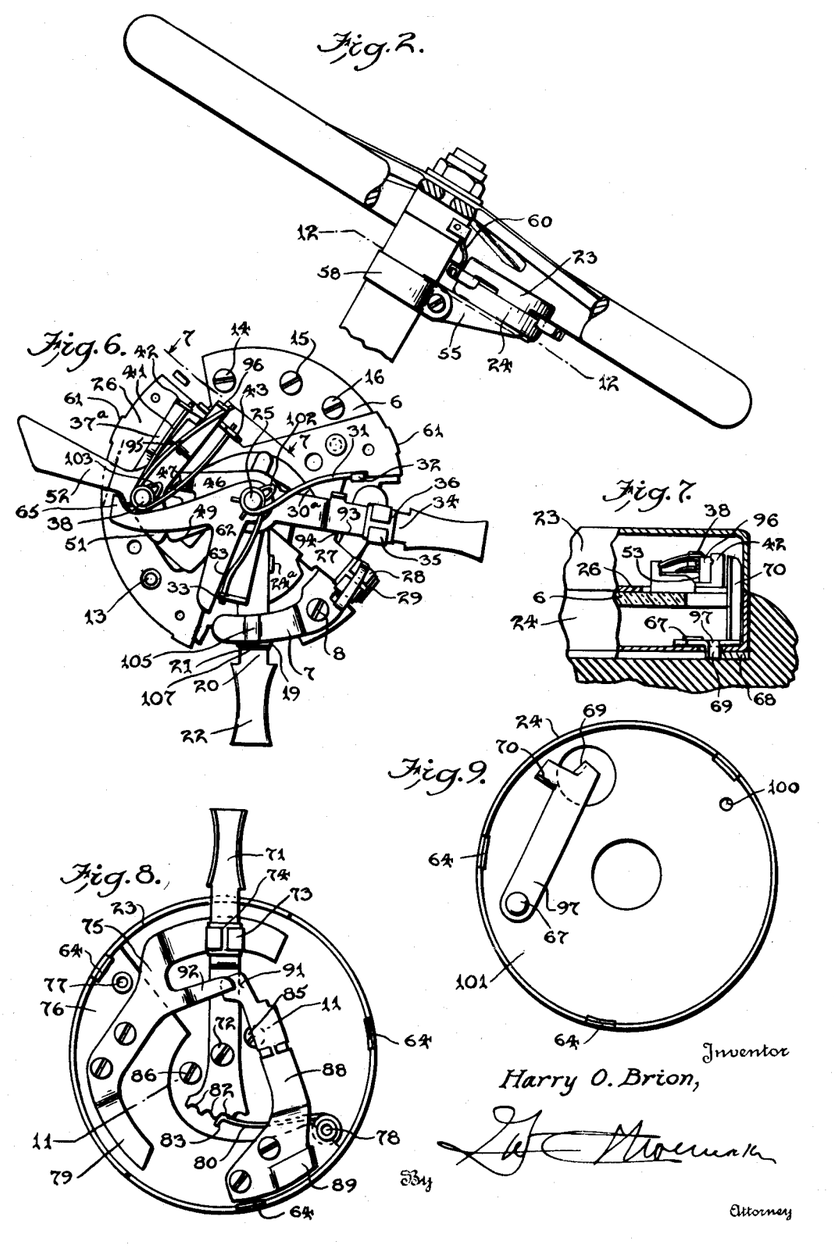
Fig. 2 is an elevation of a portion of a steering wheel and steering column, illustrating the manner of mounting the switch on the steering column.
Fig. 6 is a plan view of the mechanism illustrated in Fig. 4, showing the switch adjusted for a back-up signal.
Fig. 7 is a detail sectional view on the line 7—7 of Fig. 6, illustrating the detent and releasing means when the switch is mounted in the hub of the steering wheel.
Fig. 8 is a reverse plan view of the upper section of the switch case and the switch mechanism carried thereby when the switch is arranged as illustrated in Fig. 1.
Fig. 9 is a plan view of the lower half of the switch case shown in Fig. 1, the switch base and the mechanism thereof being removed.
Figure 5:
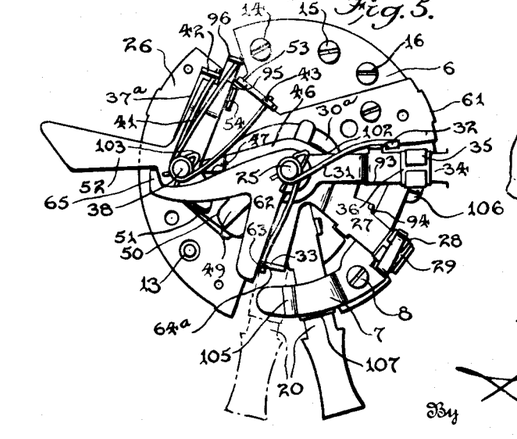
Fig. 5 is a similar view showing in full lines the switch adjusted for a right turn and in dotted lines the switch adjusted for a left turn.

In order to display complete right turn and left turn signals, the switch member 27 is moved to its closed position simultaneously with the right and left hand movements of the two way switch member 20. The switch member 20 is provided with a lateral lug or projection 24ª which is adapted to engage the switch member 27 at the right hand side edge thereof for actuating the switch member 27 when the switch member 20 is moved to the left. At the same time, when the switch member 27 is released it will, through the action of the spring 31, return the switch member 20 to its open or normal position. The switch member 20 is provided with a shoulder 26ª and when moved to the right cooperates with a shoulder 27ª on a lever 28ª pivotally mounted on the pivot post 38 and having its free end projecting on the other side of the pivot post 25 and provided with a shoulder 30ª adapted to engage the switch member 27 at the side edge thereof, as clearly illustrated in Fig. 6 of the drawings, in order to shift the said switch member 27 towards and into engagement with its contact when the switch member 20 is moved to the right. The movement of the switch member 27 by the two way switch member 20 will close the circuit to the lamp 1 when the circuit to either of the lamps 2 or 3 is closed.

With the end in view of holding the switch member 20 in an open or neutral position, there is provided a bend or indentation 105 in the spring contact 7 which receives a raised lug 107 on the contact 19 of the switch member 20. The tension of the resilient or spring contact 7 against the contact 19, when the switch member 20 is moved to a closed position, holds the said contact 19 of the switch member 20 in a closed position with either of the spring contact fingers 17 and 18. A bent or raised portion 106 of the contact 7 holds a switch member 34 in an open or neutral position. When the switch member 34 is moved to a closed position, its contact 35 slides up on the bent or raised portion 106 and the tension of the spring contact 7 against the contact 35 holds the said switch member 34 in closed position and maintains the contact 35 in engagement with the contact finger 37.

With the end in view of closing the circuit to the lamp 4, the said third switch member or lever 34 is provided. This switch member is pivoted on the center post 25 and has secured to it the contact 35, which is insulated from the switch member 34 by the insulation 36. The contact 35 engages the contact finger 37 which connects with the post 12 so as to establish electrical connection between the post 12 and the contact 7. When the movement of this switch member 34 takes place, it is also desirable to move the switch member 37 to close the circuit to the lamp 1, and to this end the switch member 34 has an abutment 93 for cooperating with an abutment 94 formed on the switch member 27 so that both switch members 27 and 34 travel together in the same direction when the switch member 34 is moved. The switch member 27 may, however, move independently of the switch member 34 under the action of the switch member 20. The switch member 34 is provided with an arm 49, the surface 50 of which, when the switch member 34 is moved to a closed position, presses against the surface 51 on a releasing lever 52, holding it in a flexed position in engagement with a beveled projection 53 and maintaining it out of the path of an abutment 54 on a detent 37ᵃ, rendering it impossible to release this signal except by manual means.

With the end of maintaining a signal, that is, a right or left turn or back-up signal, until released, a detaining means is employed for holding the switch member against the action of the spring 31, which returns the switch member 27 to its normal or open position. This detaining means, in this instance, comprises the two armed detent 37ᵃ pivoted at 38 to the base plate 26 and having on one side of the pivot a shoulder or abutment 39 adapted to engage with a shoulder or abutment 40 on the switch member 27 when the said switch member 27 is moved to closed position by either of the switch members 20 and 34. The detent 37ᵃ is urged to this position by a spring 41 consisting of a central coil and two sides, and having its central coil mounted on a post 38. The spring is held in place by engaging one end with a lug 42 on the detent 37ᵃ and the other end with a lug 43 on the base plate 26. A surface 44 on the detent 37ᵃ engages a surface 45 on the switch member 27 and holds said detent 37ᵃ and prevents it from interfering with the movement of the switch member 27 until the switch closing position of the switch member 27 is reached.

The operation of the detent may be effected to release the switch member 27 by any suitable means. In the accompanying drawings, three such means are illustrated; one manual and the other two automatic, the automatic means being governed by the position of the steering wheel. The manual means consists in the use of the switch member 34 which is provided with an arm 46 extending beyond the pivot 25. The arm 46 has a surface 47, which when the switch member 34 is pushed away from the switch closing position acts upon a projection 48 on the detent 37ᵃ and pushes the detent out of the path of the switch lever 27. The spring 31 returns the switch member 34 to normal position after the switch member 34 has been pressed away from the switch closing position to disengage the detent 37ᵃ from the switch member 27. The spring 31 returns the switch member 27 to its normal open position and also is adapted to return the switch member 20 to its neutral or open position.

Figure 12:
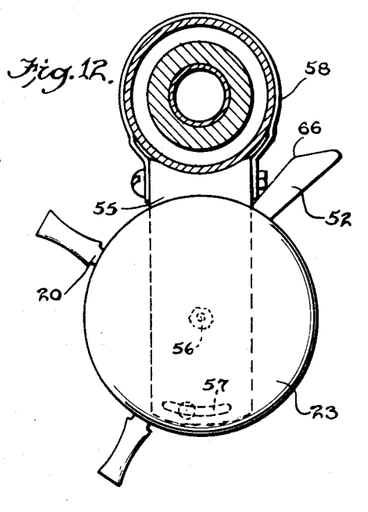
Fig. 12 is a horizontal sectional view on the line 12—12 of Fig. 2.
Figures 13, 17, 18, 19:
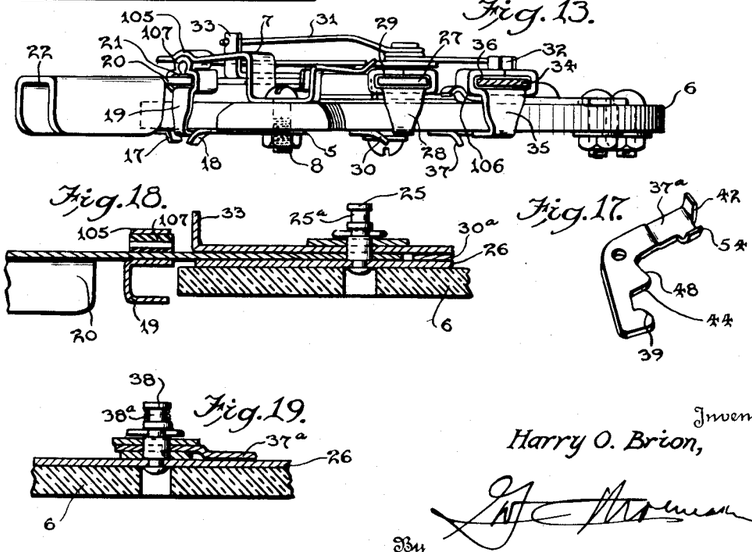
Figures 14, 15, 16, 20:
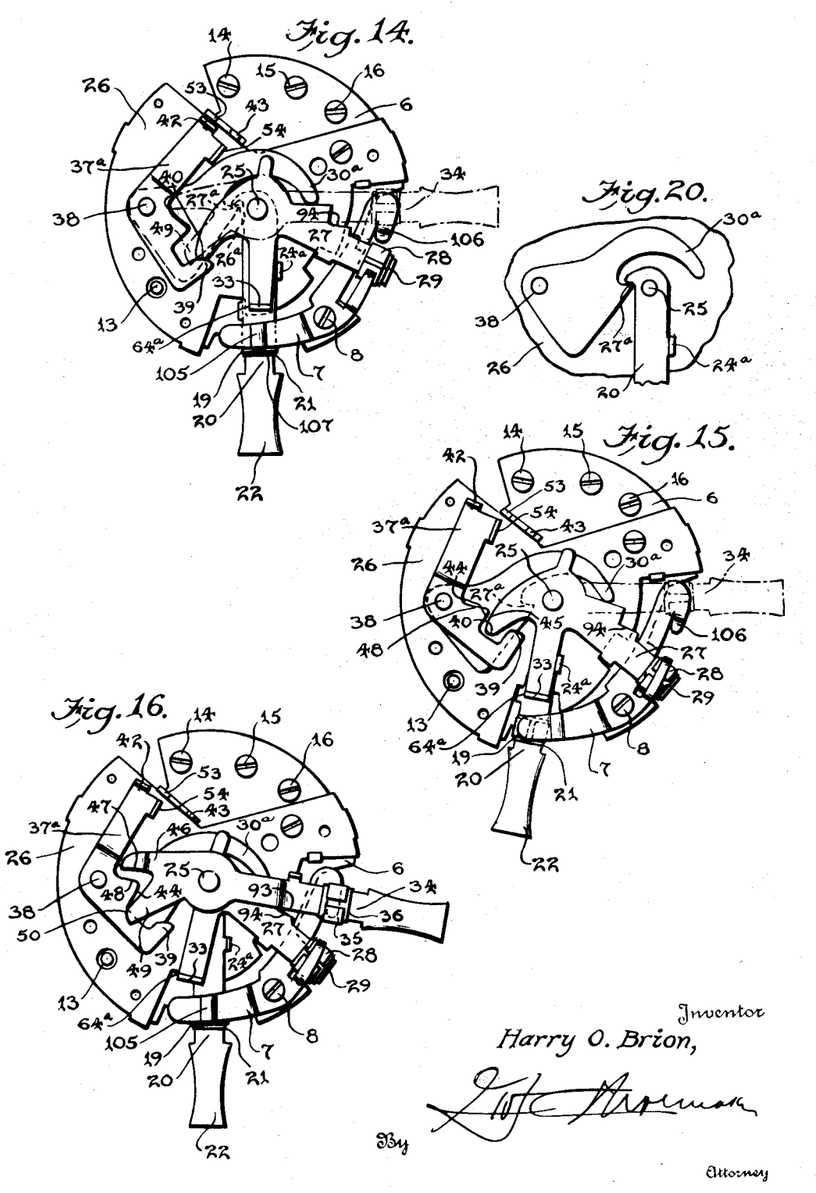
Fig. 14 is a fragmentary view illustrating the arrangement of the detent and releasing lever when all of the circuits affected by the said parts are open.
Fig. 15 is a similar view illustrating the arrangement of the detent and the releasing lever when the circuit for a left turn is closed.
Fig. 16 is a similar view illustrating the arrangement of the detent and the releasing lever when the circuit of the back-up signal is closed.
Fig. 20 is a fragmentary view showing the switch member for controlling the right and left turn signals.
Figure 21:
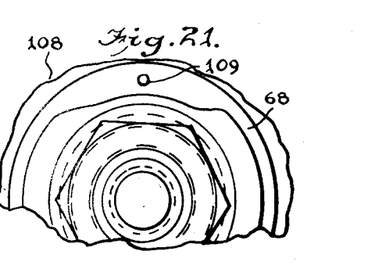
Fig. 21 is a similar view of a portion of the steering wheel showing the cam within the same.

In order to adapt the switch to automatic operation by the first automatic means, which is provided when the switch is mounted on the steering post, a bracket 55 is secured at 56 in the center of the lower half 24 of the switch case. The switch case supporting bracket, which is illustrated in Fig. 12 of the drawings, is provided with a slot 57 which permits the switch to turn and adjust the release lever 52 with relation to a cam or operating member 60 carried by the steering wheel. The bracket 55 is secured to the steering post by a strap 58, and the cam 60 is secured by screws or other suitable fastening devices to the steering wheel and is arranged parallel to the same. This cam or projection 60, which constitutes an operating member, lies, when the steering wheel is adjusted for a straight ahead drive, opposite the free end of the releasing lever 52 which projects outwardly through the side of the top case half 23. This release lever is co-pivoted with the detent 37ᵃ by the post 38 and is designed to cooperate with the two abutments 54 and 42 on the detent 37ᵃ on the side of the pivot 38 opposite the shoulder 39. When the latter is in its inner position it cooperates with the beveled projection 53 which flexes the release lever 52 laterally or upwardly and holds said release lever 52 out of the path of the abutment 54 so that the detent 37ᵃ may move into the detaining position with relation to the switch member 27, even though the release member is pressed inwardly by a two armed equalizing lever 62. One of the arms of the equalizing lever 62 has a surface 63 which cooperates with a shoulder 33 on the switch member 27. When the switch member 27 is moved to the closed position, it moves slightly beyond the holding position of the detent 37ᵃ, which causes the cooperation of a shoulder 64 on the switch member 27 with the surface 63 on the equalizing lever 62. A shoulder 65 on equalizing lever 62 acts upon the release lever 52 and holds it in a flexed position upon the beveled projection 53, maintaining said release lever 52 out of the path of the abutment 54 of the detent 37ᵃ, permitting the switch to be set while the surface 66 on the outwardly extending arm or portion of the release lever 52 is held from the path of the cam or projection 60. When the cam or projection 60 is moved out of the path of the free end 66 of the release lever 52, the release lever, under the action of a spring 95, moves outwardly and beyond the abutment 54 on the detent 37ᵃ. The spring 95, which consists of a coil and two sides, has its coil mounted on the post 38 and is held in place at one end by a notch in the lug 43 which is formed on the base plate. The other end of the spring engages a notch in the lug 96 which is formed on the release lever 52. When the steering wheel is again swung to straighten the direction of travel of the vehicle, the cam 60 will engage the surface 66 on the outwardly extending arm of the release lever 52, which in turn engages the abutment 54 on the detent 37ᵃ and moves it on its pivot so as to disengage the shoulder 39 on said detent from the shoulder 40 on the switch member 27, which will be returned to its normal or open position by the action of the spring 31. This automatic operation occurs when the switch member 20 is swung either to the right or to the left to indicate a right hand or left hand turn.

The second automatic means illustrated in the drawings for releasing the detent is employed when the switch is mounted in the hub of the steering wheel, as illustrated in the drawings. In this method, the outwardly extending arm of the release lever 52 does not protrude and it is removed at the dot and dash line A—A indicated in Fig. 4 of the drawings. A short or truncated outer arm is left on the release lever 52, which is engaged at one end by a finger lever 97 pivoted at 67 to the lower case half 24. A cam 68 is fastened to the hub of the steering wheel and turning with it acts upon the finger 69 of the finger lever 97 which protrudes through an opening in the bottom of the case half 24. The cam 68 moves the finger lever 97 so that a finger 70 will act upon the release lever 52 and cause the same to release the switch member in a manner heretofore described in connection with the automatic means employed when the electric switch is mounted on the steering post.

The cam 68 is secured to the hub of the steering wheel 108 by a pin 109. The lower case half 24 is fastened by a flange 110 to the end of the tube 111 which passes through the steering post 112. The wires from the terminals 9 to 16, inclusive, pass through the said tube 111. The tube 111 is fastened at the lower end of the steering post but is independent of it, permitting the steering wheel 108 to turn, thereby turning the cam 68 without turning the tube 111, which in turn holds the switch case half 24 in a fixed position. A nut 113 is threaded on the steering post 112 and holds the steering wheel to the steering post 112. The steering column 114 supports the steering post 112 in position by means of a bushing 115.

When the electric switch is mounted at the center of the hub means is provided in the upper half 23 of the switch case to close the circuits to the contacts 14, 15 and 16 on the fiber base 6. This comprises a lever 71 pivoted at 72 to the center of the upper case half 23 and provided with a contact 73 fastened to the lever 71 and insulated from the same by insulation 74. This contact 73 moves upon a contact strip 75 which is fastened to a fiber base 76 at spaced points. The fiber base is held in place within the upper case half by studs 77 and 78. One end 79 of the contact strip 75 flexes away from the base 76 and when the switch is assembled makes contact with the contact post 8 on the base 6 of the lower half 24 of the switch case.

In order to maintain the lever 71 in a definite position either closing a circuit to high or low beam lights, or parking lights, or in a neutral position, four notches 82 are provided in the end of the lever 71. These notches cooperate with a spring 80 secured at the stud 78 and having one end engaging against the adjacent side wall of the upper half 23 of the case. The spring 80 has a coil arranged on the stud 78 and the other end 83 is provided with a bend formed so as to fit the notches 82 for engagement with them to hold the lever 71 in a firm position through energy stored in the spring 80. When the lever 71 is moved to contact the post 14, 15 or 16, it closes the circuit between said post and the post 8, so as to light the parking light, dim or low beam lights, or bright or high beam lights, respectively.

In order to render the switch complete for signalling purposes, a horn button 84 is mounted on the switch case by means of screws 85 and 86 secured to the horn button and slidably mounted in the top of the switch case. The ends of the screws are threaded into the horn button and the heads of the screws are located interiorly of the switch case. A spring 87 holds the button away from the upper section 23 of the case, thereby normally preventing the screw 85 from moving a spring lever or member 88. The spring member 88 is fastened to the fiber base 76 and has a portion 89 flexed so that it presses and engages contact post 13 when the switch is assembled. When the horn button 84 is pressed against the switch casing, it forces inwardly the screw 85 which rests upon an insulated portion 90 on the spring lever 88, and moves the end 91 against the arm 92 on the contact strip 75. This closes the circuit between the contact posts 5 and 13 to the horn of the motor vehicle.

The case halves 23 and 24 and the switch base plate 26 are held firmly together in definite relationship by three marginal projections 61 on the base plate 26 cooperating with swaged notches 64 in the edges of the case halves 23 and 24. The case halves 23 and 24 are held together by screws which pass through holes 100 and 101 in the case bottom and through holes 98 and 99 in base plate 26 and fiber base 6 and then into the tapped studs 77 and 78 in the top 23 of the case.

The switch members are retained on the center post 25 by a spring clip 102 which fits in a groove in the center post 25, and the detent and releasing lever and the other movable parts on the pivot post 38 are retained thereon by a similar spring clip 103 which fits in a groove in the pivot post 38.

The center and side posts 25 and 38 are provided with grooves 25ª and 38ª, respectively, to form spaces, which will prevent the coils of the springs 31, 41 and 95 from binding and ultimately breaking.

What is claimed is:—

1. A switch comprising a two way pivoted switch member, two contacts arranged to be engaged by the said switch member, one when the switch member is moved in one direction from a neutral position and the other when the switch member is moved in the opposite direction from the neutral position, a second switch member coaxially pivoted with the two way switch member, a contact arranged to be engaged by the second switch member, a detent for locking the second switch member when engaged with its cooperating contact, a third pivoted switch member, and a contact arranged to be engaged by the third switch member, the latter being provided with means for moving the detent out of engagement with the second switch member for releasing the same.

2. A switch comprising a pivoted two way switch member, two contacts arranged to be engaged by the two way switch member, one when said switch member is moved in one direction from a neutral position and the other when said switch member is moved in the opposite direction from the neutral position, a second switch member pivoted coaxially with the two way switch member, a contact arranged to be engaged by the second switch member, a detent for locking the second switch member against movement when the said members are in engagement with their contacts, spring means for automatically moving the said switch members out of engagement with their contacts to open positions when the switch members are released by the detent, a third switch member, and a contact arranged to be engaged by the third switch member, said third switch member being provided with means for moving the detent out of engagement with the second switch member to release the same.

3. A switch comprising a pivoted two way switch member, two contacts arranged to be engaged by the two way switch member, one when said switch member is moved in one direction from a neutral position and the other when said switch member is moved in the opposite direction from the neutral position, a second switch member pivoted coaxially with the two way switch member, a contact arranged to be engaged by the second switch member, a detent for locking the second switch member against movement when the said members are in engagement with their contacts, a spring connected with one of the switch members for moving the same to open position, means operated by the spring actuated switch member for moving the other of said switch members to open position when released by the detent, a third switch member, a contact arranged to be engaged by the third switch member, the latter being provided with means for engaging and manually moving the detent out of engagement with the second switch member to release the same.

4. A switch comprising a pivot post, a two way switch member mounted on the pivot post, two contacts arranged to be engaged one when said switch member is moved in one direction from a neutral position and the other when said switch member is moved in the opposite direction from the neutral position, a second switch member mounted on the pivot post, a contact arranged to be engaged by the second switch member, a spring supported by the pivot post and connected with the second switch member for moving the same to open position, means for transmitting motion from the second switch member to the two way switch member for moving the latter to open or neutral position, a detent for engaging the second switch member for holding the same against movement when the said switch members are engaged with their contacts, a third switch member mounted on the said pivot post, and a contact arranged to be engaged by the third switch member, said third switch member being provided with means for moving the detent out of engagement with the second switch member and normally held against such detent releasing movement by the said spring, the latter operating to return the third switch member to normal position after the third switch member has been moved to reelase the second switch member.

5. A switch comprising a two way switch member, two contacts arranged to be engaged by the two way switch member, one when said switch member is moved in one direction from a neutral position and the other when the said switch member is moved in the opposite direction from the neutral position, a second switch member pivoted coaxially with the two way switch member, a contact arranged to be engaged by the second switch member, a detent for holding the second switch member against movement when the said members are engaged with their contacts, and means for automatically moving the detent out of engagement to release the second switch member, including a releasing lever engageable with the detent, a pivoted finger lever having oppositely extending fingers, one of the fingers being arranged to engage and actuate the releasing lever, and a cam mounted on the steering wheel and arranged to engage the other finger of the finger lever.

6. A switch comprising a two way switch member, two contacts arranged to be engaged by the two way switch member, one when said switch member is moved in one direction from a neutral position and the other when the said switch member is moved in the opposite direction from the neutral position, a second switch member pivoted coaxially with the two way switch member, a contact arranged to be engaged by the second switch member, a detent for holding the second switch member against movement when the said members are engaged with their contacts, and means for automatically moving the detent out of engagement to release the second switch member including a releasing lever engageable with the detent and having a projecting portion, and means located beneath and carried by the steering wheel and arranged to engage the projecting portion of the releasing lever for moving the detent to release the second switch member.

7. A switch comprising a two way switch member, two contacts arranged to be engaged by the two way switch member, one when said switch member is moved in one direction from a neutral position and the other when the said switch member is moved in the opposite direction from the neutral position, a second switch member pivoted coaxially with the two way switch member, a contact arranged to be engaged by the second switch member, a detent for holding the second switch member against movement when the said members are engaged with their contacts, and means for automatically moving the detent out of engagement to release the second switch member including a releasing lever engageable with the detent and having a projecting portion, and a cam member located beneath and carried by the steering wheel and arranged to engage the projecting portion of the releasing lever to move the detent out of its engaging position to release the second switch member.

8. A switch comprising a two way switch member, two contacts arranged to be engaged, one by the switch member when said switch member is moved in one direction from a neutral position and the other when said switch member is moved in the opposite direction from the neutral position, a second switch member coaxially pivoted with the two way switch member, a contact arranged to be engaged by the second switch member, spring means for actuating the second switch member to move the same to open position, means for enabling the two way switch member to move the second switch member to closed position and for enabling the second switch member to move the two way switch member to open position, a detent for engaging the second switch member to hold the second switch member in engagement with its contact, a releasing lever having an interlocking engagement with the detent, means located in the path of the releasing lever for disconnecting the releasing lever from the detent, an equalizing lever coaxially pivoted with the switch members and arranged to move the releasing lever to disengage the same from the detent during the closing operation of the switch members, means for automatically returning the releasing lever to its interlocking engagement with the detent, and means actuated by the steering wheel of a motor vehicle for swinging the releasing lever to move the detent out of its engaging position.

9. A switch comprising a two way switch member, two contacts arranged to be engaged, one by the switch member when said switch member is moved in one direction from a neutral position and the other when said switch member is moved in the opposite direction from the neutral position, a second switch member coaxially pivoted with the two way switch member, a contact arranged to be engaged by the second switch member, spring means for actuating the second switch member to move the same to open position, means for enabling the two way switch member to move the second switch member to closed position and for enabling the second switch member to move the two way switch member to open position, a detent for engaging the second switch member to hold the said switch member in engagement with its contact, a releasing lever having an interlocking engagement with the detent, means located in the path of the releasing lever for disconnecting the releasing lever from the detent, an equalizing lever coaxially pivoted with the switch members and having angularly related arms, one of the arms being arranged to engage the releasing lever to move the same out of engagement with the detent and the other arm being arranged to be engaged by the second switch member to effect such movement of the releasing lever, spring means for automatically returning the releasing lever to its interlocking relation with the detent, and means operated by the steering wheel of a motor vehicle for swinging the releasing lever to move the detent out of its engaging position to release the second switch member.

10. A switch comprising a center pivot post and a side pivot post, a plurality of switch members mounted on the center pivot post, contacts cooperating with the switch members, a detent mounted on the side pivot post for holding the switch members in engagement with their cooperating contacts, a releasing lever also mounted on the side pivot post and having an interlocking engagement with the detent, means located in the path of movement of the releasing lever to move the same out of engagement with the detent, an equalizing lever mounted on the center pivot post and actuated by one of the switch members and arranged to engage the releasing lever for moving the same to disengage it from the detent, means for automatically returning the releasing lever to its interlocking relation with the detent, and means for operating the releasing lever to move the detent out of its engaging position to release the second switch member.

11. A switch comprising center and side pivot posts provided with grooves, a plurality of switch members mounted on the center pivot post, contacts cooperating with the switch members, a detent mounted on the side pivot post for holding one of the switch members in engagement with its cooperating contact, a releasing lever also mounted on the side pivot post and having an interlocking engagement with the detent, means located in the path of movement of the releasing lever to move the same out of engagement with the detent, an equalizing lever mounted on the center pivot post and actuated by one of the switch members and arranged to engage the releasing lever for moving the same to disengage it from the detent, means for automatically returning the releasing lever to its interlocking relation with the detent, means for operating the releasing lever to move the detent out of its engaging position to release the engaged switch member, and spring clips engaging the grooves of the center and side pivot posts and retaining the switch members and equalizing lever on the center pivot post and the detent and the releasing lever on the side pivot post.

12. A switch comprising a case designed to be mounted centrally of the steering wheel of a motor vehicle and composed of upper and lower sections, a plurality of contacts carried by the lower section of the switch case, a contact strip mounted within the upper section of the switch case, a pivoted switch lever carried by the upper section of the switch case and having a contact engaging the contact strip and movable along the same and adapted to be carried successively into engagement with the contacts of the lower section of the switch case, said switch member being provided with a projecting portion having a plurality of notches, and spring means mounted within the upper switch case section and arranged to engage the notches of the switch member for holding the latter in its different positions with respect to the contacts of the lower section of the switch case.

13. A switch comprising a case designed to be mounted centrally of the steering wheel of a motor vehicle and composed of upper and lower sections, a plurality of contacts carried by the lower section of the switch case, a contact strip mounted within the upper section of the switch case, a pivoted switch lever carried by the upper section of the switch case and having a contact engaging the contact strip and movable along the same and adapted to be carried into engagement with certain of the contacts of the lower switch case, a spring contact member arranged within the upper section of the case and engaging one of the contacts of the lower section of the case and having a portion normally spaced from the contact strip, and a horn button mounted on the upper section of the case for inward and outward movement and provided with means for engaging the spring member for moving the same into engagement with the contact strip.

14. A switch comprising a case designed to be mounted centrally of the steering wheel of a motor vehicle and composed of upper and lower sections, a plurality of contacts carried by the lower section of the switch case, a contact strip mounted within the upper section of the switch case, a pivoted switch lever carried by the upper section of the switch case and having a contact engaging the contact strip and movable along the same and adapted to be carried successively into engagement with the contacts of the lower section of the switch case, said switch member being provided with a projecting portion having a plurality of notches, and a spring mounted within the upper section of the switch case and having a terminal portion provided with a bend arranged to engage the notches of the switch member for holding the same in its different positions with relation to the contacts of the lower section of the switch case.

15. A switch comprising a bracket provided with means for securing it to the steering post of a motor vehicle and having a supporting portion provided with an arcuate slot, a case pivotally mounted on the supporting portion of the bracket concentric with the said slot, means operating in the slot for adjustably securing the case to the bracket, a switch member pivotally mounted within the case, a detent for holding the switch member against movement, release means for moving the detent from its engaging position including an arm projecting from the said case, and projecting means carried by the steering wheel of the motor vehicle and adapted to engage the said projecting portion of the release means, the adjustment of the case permitting the projecting portion of the release means to be adjusted to position the same properly with relation to the projecting means of the steering wheel.

16. A switch comprising a two way switch member, two contacts arranged by the two way switch member, one when said switch member is moved in one direction from a neutral position and the other when the said switch member is moved in the opposite direction from the neutral position, a second switch member pivoted coaxially with the two way switch member, a contact arranged to be engaged by the second switch member, means for moving said second switch member to engage its contact when the two way switch member is moved to engage either of its contacts, and means for holding said second switch member in engagement with its contact when said two way switch member is returned manually to its open or neutral position.

17. A switch comprising a two way switch member, two contacts arranged by the two way switch member, one when said switch member is moved in one direction from a neutral position and the other when said switch member is moved in the opposite direction from the neutral position, a second switch member pivoted coaxially with the two way switch member, a contact arranged to be engaged by the second switch member, means for moving said second switch member to engage its contact when the two way switch member is moved to engage either of its contacts, means for holding said second switch member in engagement with its contact when said two way switch member is returned manually to its open or neutral position, and spring means for holding the two way switch member in its open or neutral position and also in its closed positions.

HARRY O. BRION.